United States Patent

[11] 3,624,554

[72] Inventors Stephen Earl Hilliker
Mooresville;
John Barrett George, Indianapolis, both of Ind.

[21] Appl. No. 21,901
[22] Filed Mar. 23, 1970
[45] Patented Nov. 30, 1971
[73] Assignee RCA Corporation

[54] ULTRAHIGH FREQUENCY OSCILLATOR UTILIZING TRANSMISSION LINE TUNABLE RESONANT CIRCUITS
13 Claims, 20 Drawing Figs.

[52] U.S. Cl. .......... 331/99, 331/117 D, 331/177 V, 333/84 M, 334/15, 334/42
[51] Int. Cl. .......... H03b 5/18
[50] Field of Search .......... 331/96, 99, 117 D, 177 V; 333/84 M; 334/15, 41–45

[56] References Cited

UNITED STATES PATENTS 3,444,480 5/1969 Tykulsky et al. .......... 331/96
3,483,483 12/1969 Erler et al. .......... 331/117 D X

*Primary Examiner*—Roy Lake
*Assistant Examiner*—Siegfried H. Grimm
*Attorney*—Eugene M. Whitacre

ABSTRACT: An ultrahigh frequency oscillator utilizes tunable transmission lines as a frequency determining network. The circuit includes a dielectric plate having a conductive section disposed on a first plate face opposed on the second plate face by a conductive ground plane. The oscillator active device has one of its electrodes coupled to a first point located on the conductive section and another of its electrodes coupled to a point on the ground plane located directly opposite the first point. A window may be provided in the ground plane with conductive areas disposed within the window area. The conductive areas provide circuit capacitances for the oscillator.

PATENTED NOV 30 1971 3,624,554

INVENTORS
STEPHEN EARL HILLIKER
JOHN BARRETT GEORGE
BY David E. Pitchenik
ATTORNEY INVENTORS
STEPHEN EARL HILLIKER
JOHN BARRETT GEORGE
BY David C. Pitchenik
ATTORNEY INVENTORS
STEPHEN EARL HILLIKER
JOHN BARRETT GEORGE
BY David E. Pitcherik
ATTORNEY INVENTORS
STEPHEN EARL HILLIKER
JOHN BARRETT GEORGE
BY David E. Fitchenik
ATTORNEY INVENTORS
STEPHEN EARL HILLIKER
JOHN BARRETT GEORGE
BY David E. Pitchenik
ATTORNEY INVENTORS
STEPHEN EARL HILLIKER
JOHN BARRETT GEORGE
BY David E. Fitchunk
ATTORNEY

ULTRAHIGH FREQUENCY OSCILLATOR UTILIZING TRANSMISSION LINE TUNABLE RESONANT CIRCUITS

The present invention pertains to ultrahigh frequency (UHF) oscillators, and more particularly, to UHF oscillators employing tunable transmission lines.

UHF oscillators use frequency determining networks which are subject to parasitic resonances. Consequently, the oscillator may, under certain conditions, resonate in the parasitic rather than the desired mode. Moreover, where the parasitic frequency is harmonically related to a frequency within the desired oscillator frequency band, even though the oscillator does not resonate in the parasitic mode, a reduction of fundamental frequency oscillator signal voltage may occur as the tunable circuit is adjusted to resonate within the vicinity of the related frequency.

An oscillator embodying the present invention suppresses spurious oscillation at a frequency above the desired frequency range. The oscillator includes a transmission line having an elongated conductive section disposed on a supporting plate and overlying a conductive ground plane area on the opposite side of the plate. The transmission line is of the type which is susceptible to spurious resonances above the desired frequency of operation, with the spurious resonance characterized by a voltage null at a particular location on the transmission line. A transistor has its collector electrode coupled to the location on said transmission line, and a feedback means interconnects the transistor's base, collector and emitter electrodes to sustain oscillation at a frequency determined by the transmission line. The feedback means includes an impedance element connected from one of the transistor's base and emitter electrodes to the ground plane at a point opposite the location of the voltage null on the transmission line.

In accordance with a feature of the invention, the ground plane may include a window exposing the dielectric plate. Conductive areas are disposed within the ground plane window to form circuit capacitances utilized in the oscillator.

A complete understanding of the present invention may be obtained from the following detailed description of a specific embodiment thereof, when taken in conjunction with the accompanying drawings, in which.

Figure 11:
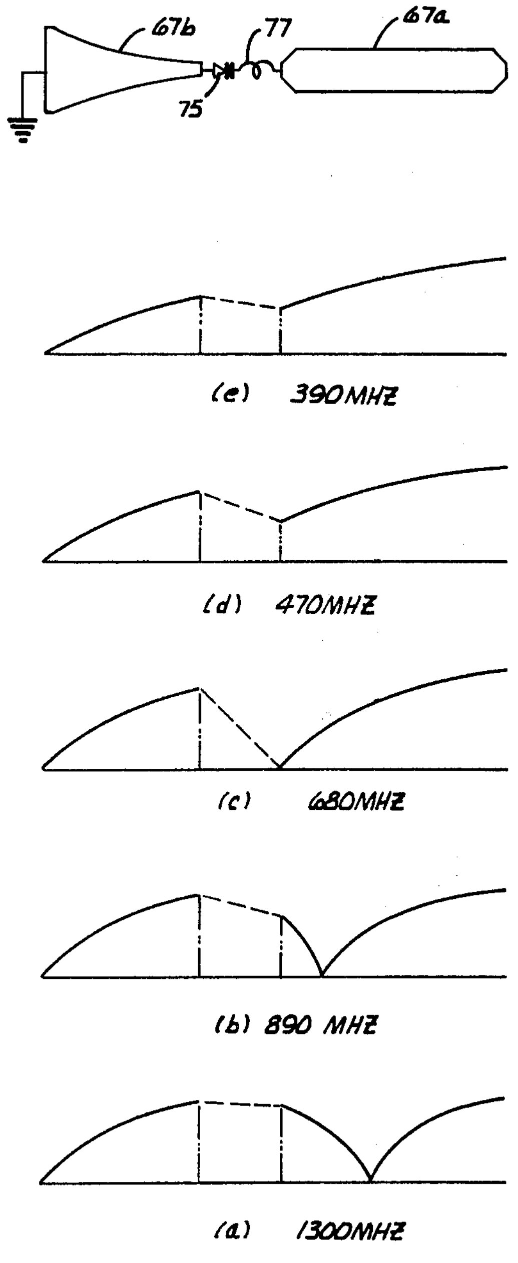

FIGS. **10*a–c*** are enlarged partial section views of the substrate showing one of the adjustable tracking inductors set for minimum, nominal and maximum inductance;

FIGS. **11*a–e*** are a series of curves showing standing voltage waves helpful in understanding the operation of the tuner;

FIGS. **12*a–e* are a series of curves showing standing waves of current corresponding to the curves shown in FIG. 11**.

Referring now to the drawings wherein like reference numerals designate similar elements in the various views, a UHF television tuner 50 is enclosed in a metal housing 52 which is maintained at a reference potential, shown as ground. The UHF tuner includes an RF amplifier stage 54, an oscillator stage 56, a mixer stage 58, and an IF amplifier stage 60. UHF television signals are intercepted by an antenna, not shown, and applied to a UHF input terminal 62. The input signals are amplified in the amplifier stage 54 and heterodyned in the mixer stage 58 with locally generated signals from the oscillator stage 56 to produce an intermediate frequency signal which is thereafter amplified in the IF amplifier stage 60 to produce an amplified intermediate frequency signal output at an IF output terminal 64.

The tuner includes four tunable resonant circuits 66, 68, 70 and 72. The tunable resonant circuit 66 is associated with the RF amplifier input circuitry, while the tunable resonant circuits 68 and 70 are part of a double tuned interstage network between the RF amplifier stage 54 and the mixer stage 58. The tunable resonant circuit 72 is used to establish the frequency of oscillation of the oscillator stage 56.

The tunable resonant circuits 66, 68, 70 and 72 include transmission line structures which are tuned by variable capacitance diodes. All of the transmission line structures include conductive elements formed on both faces of a dielectric plate. Tunable resonant circuit 66 includes aligned transmission line sections **67*a* and 67*b*; tunable resonant circuit 68 includes the transmission line sections 69*a* and 69*b*; tunable resonant circuit 70 includes the transmission line sections 71*a* and 71*b*; and finally, tunable resonant circuit 72 includes the transmission line sections 73*a* and 73*b*. One end of the second line sections 67*b*, 69*b*, 71*b* and 73*b*** is connected to the point of reference potential. Each pair of line sections cooperate with the ground plane on the opposite side of the dielectric plate to operate as transmission line.

The two sections of each composite transmission line are coupled by variable capacitance tuning diodes 75, 79, 83 and 87 and adjustable tracking inductors 77, 81, 85 and 89, respectively. Each of the series connected variable capacitance diodes 75, 79, 83 and 87 exhibit a capacitance whose magnitude varies inversely with the magnitude of reverse bias applied across the variable capacitance diode. The tunable resonant circuits 66, 68 and 70 are apportioned to tune across a frequency band ranging from 470 MHz. through 890 MHz., while the tunable resonant circuit 72 associated with the oscillator stage 56 is apportioned to tune across a band of frequencies ranging from 517 MHz. through 931 MHz.

Each composite transmission line is apportioned so that the second sections **67*b*, 69*b* and 71*b* of the line are one quarter wavelength resonant at a frequency above 890 MHz, the highest desired frequency to which the tunable resonant circuit must tune. The first transmission line sections 67*a*, 69*a* and 71*a* are apportioned to be half-wavelength resonant above the highest frequency to which the tunable resonant circuit must tune, i.e., 890 Mhz. In a like manner, the second section of transmission line 73*b* associated with the oscillator tunable resonant circuit 72 is apportioned to be ¼-wavelength resonant at a frequency above 931 MHz, while the first transmission line section 73*a*** is apportioned to be half-wavelength resonant above 931 MHz.

The resonant frequency of each section may be measured by electrically disconnecting the variable capacitance tuning diode and adjustable tracking inductor and thereafter coupling a unit impulse of energy into the section under investigation. The unit impulse will cause the section to ring simultaneously at several related frequencies, which can be measured, for example, by a sampling oscilloscope. The fundamental resonant frequency is the lowest frequency present in the ringing section. The mode of resonance can be determined by measuring the standing wave ratios along the section to determine the voltage maxima and null points.

Figure 1:
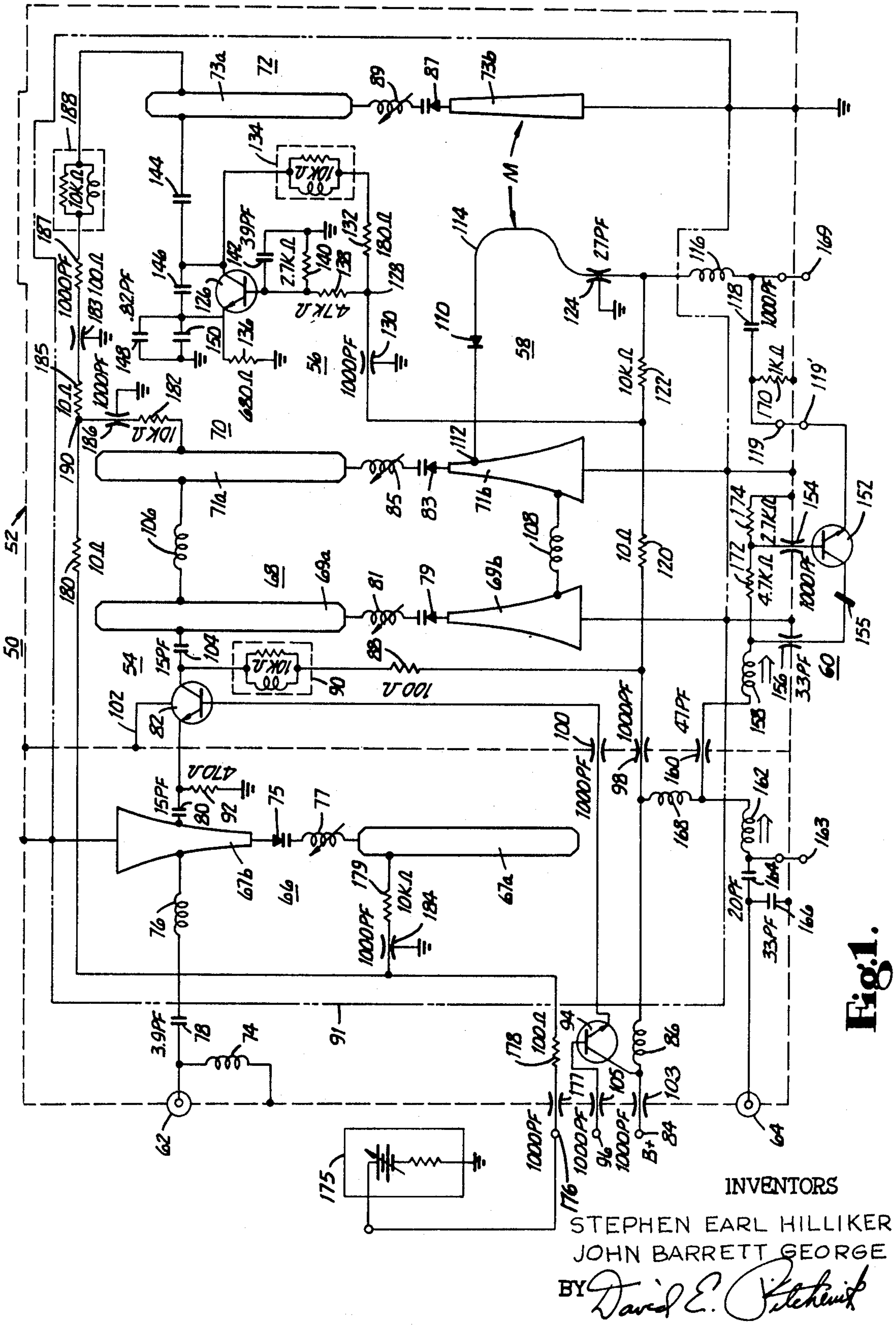
FIG. 1 is a schematic circuit diagram of a UHF television tuner embodying the present invention.
Figure 2:
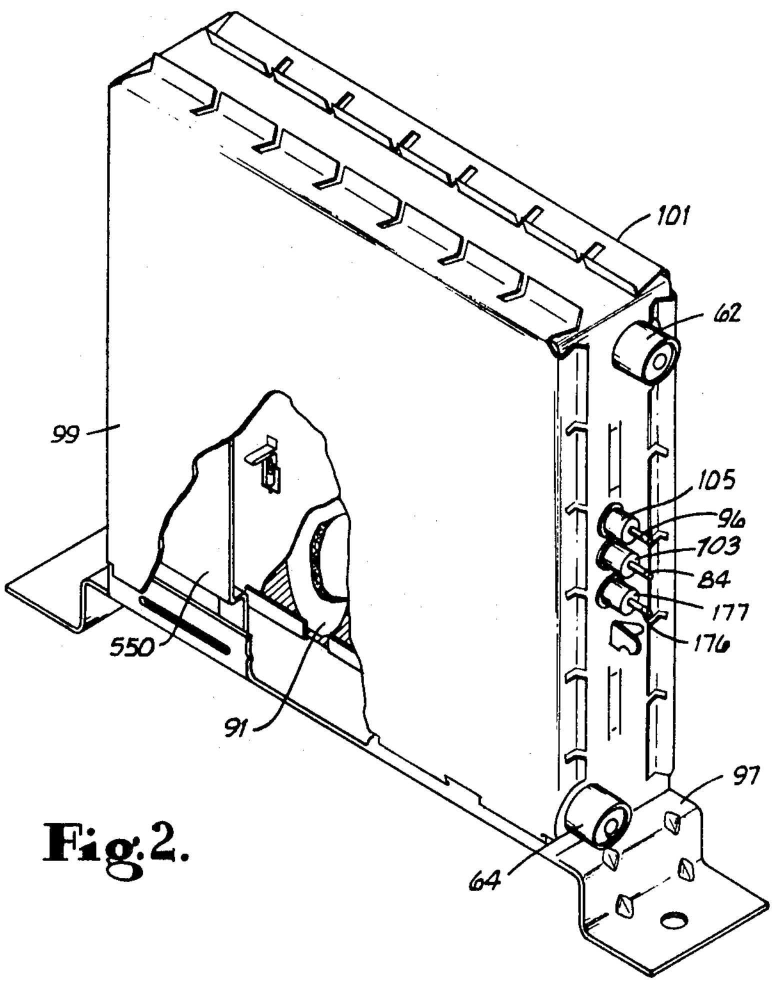
FIG. 2 is a perspective view, partially broken away, of the tuner schematically shown in FIG. 1; transmission frequency b)
Figure 3:
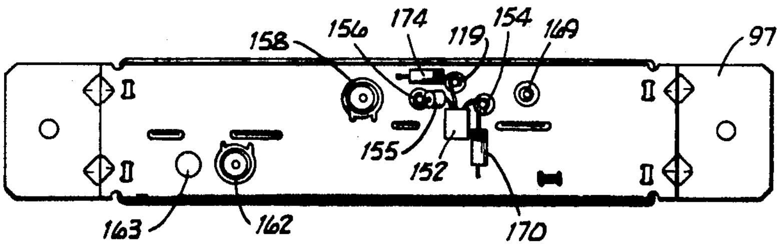
FIG. 3 is a bottom view of the tuner shown in FIG. 2.
Figure 4:
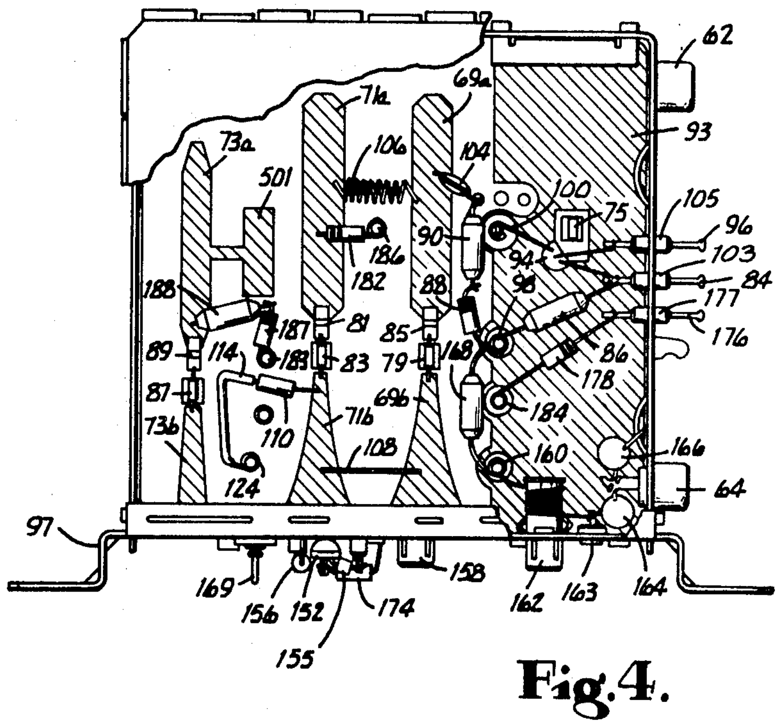
FIG. 4 is a left side view with the tuner cover and chassis frame broken away to expose the tuner components.
Figure 5:
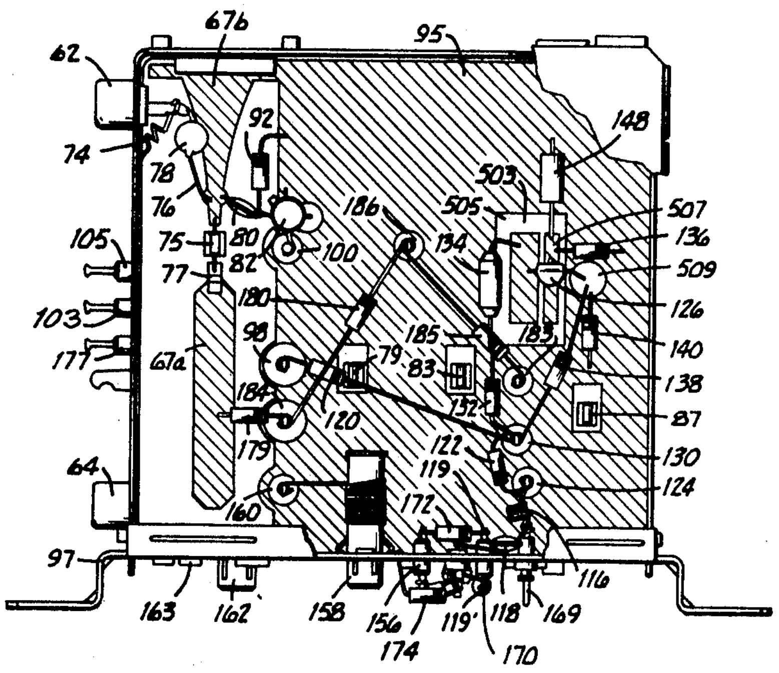
FIG. 5 is a right side view of the tuner shown in FIG. 2 with the tuner cover and chassis frame broken away to show the tuner components.
Figure 6:
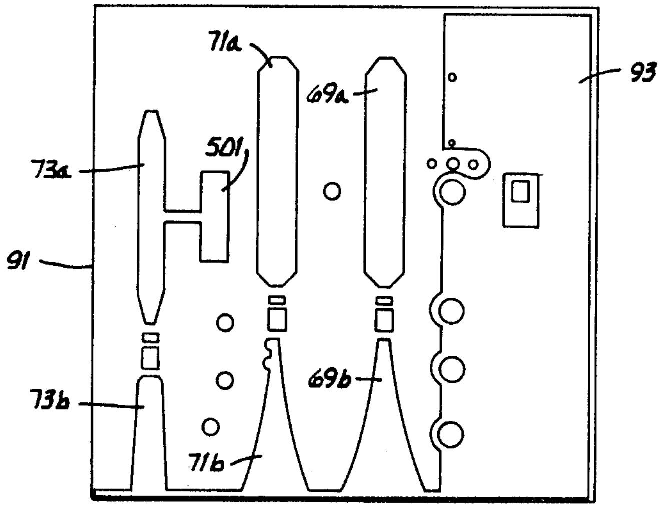
FIG. 6 is a plan view of the tuner substrate and pattern shown in FIG. 4, drawn to scale, with all the tuner components and the substrate coating material removed.
Figure 7:
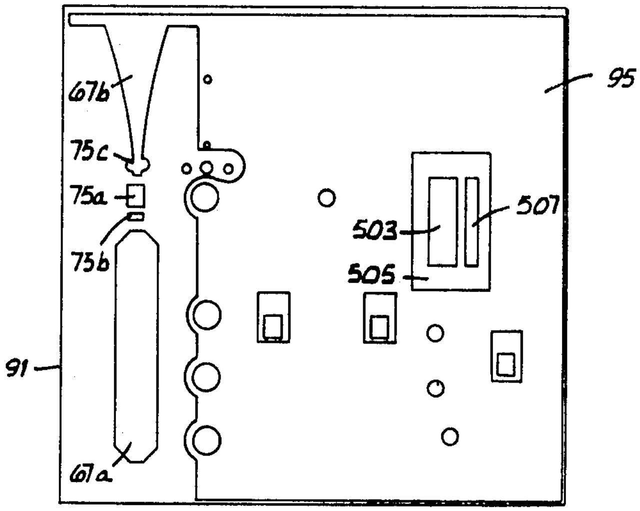
FIG. 7 is a plan view of the tuner substrate and patterns shown in FIG. 5, drawn to scale, with all the tuner components and the substrate coating material removed.

A dielectric plate or substrate 91, which supports the composite transmission lines, is mounted in a conductive enclosure (FIG. 2). The enclosure includes detachable covers 99 and 101 and a chassis or frame member 97. Two ground plane sections 93 and 95 are disposed on opposite sides of the substrate 91. The composite transmission lines 69, 71 and 73 include and are disposed opposite the ground plane section 95, while the RF input composite transmission line 67 includes and is disposed opposite the ground plane section 93. The substrate 91 and its conductive areas are shown in FIGS. 6 and 7, which are drawn approximately to scale. The substrate height is 3.375 inches and the substrate width is 3.500 inches. While the several RF composite transmission lines 67, 69, and 71 are designed to resonate at approximately the same frequency for a given diode capacitance, they differ slightly in size to compensate for the effects introduced by the different tuner components connected as shown in FIGS. 4 and 5.

The substrate 91, which is about 50 milliinches thick, is fabricated from an aluminum oxide consisting of approximately 85 percent $AL_2O_3$ and 15 percent mixture of calcium oxide, magnesium oxide and silicon dioxide. A conductive pattern, about 0.0005 inch thick, is disposed on both the substrate faces and consists of silver and glass which has been fused at 900° C. The entire pattern is covered by a copper plating 0.0002 to 0.0005 inch thick. A moisture- and solder-resistant silicon, modified to harden, is applied to the entire substrate and copper-plated pattern, with the exception of bonding pads used to electrically connect the tuner components to the substrate pattern. One suitable modified silicon is manufactured by Electroscience Corporation and designated 240–SB. The exposed bonding pads on the substrate facilitates rapid and accurate assembly of the tuner. In FIGS. 2, 4 and 5, the conductive sections on the substrate (the transmission line sections, the ground plane sections, and the capacitor plates associated with the oscillator circuit) are shown crosshatched to indicate the insulative coating which normally covers these components has been removed.

Figure 8:
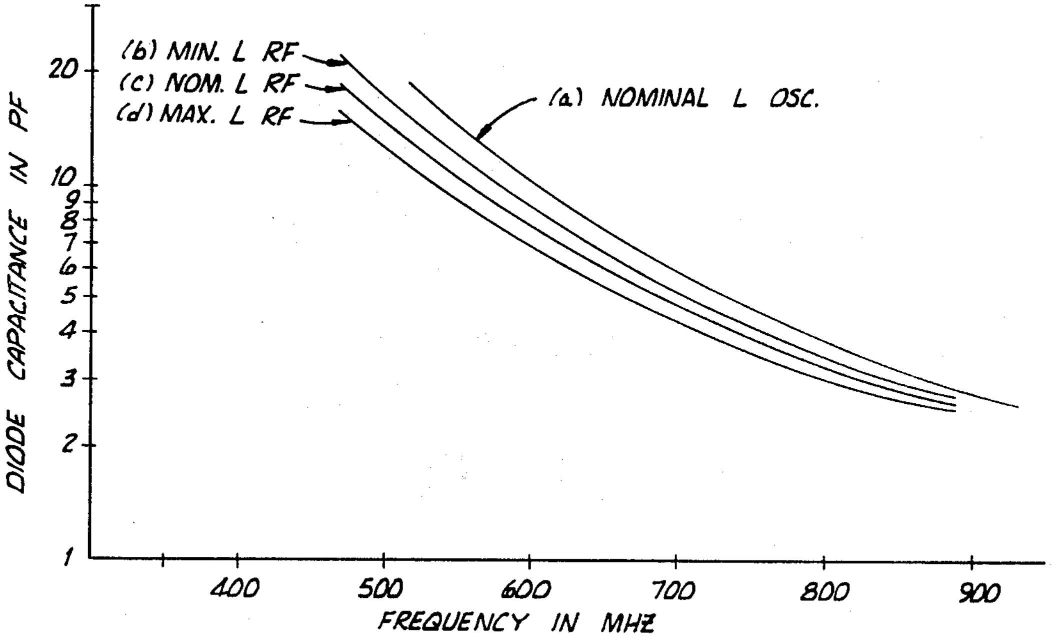
FIG. 8 is a series of curves showing plots of tuning capacity as a function of resonant frequency for the tunable resonant circuits of the tuner.

Shaping of each composite transmission line section 67*b*, 69*b* and 71*b* provides a relative tracking between the tunable resonant circuits 66, 68 and 70 and oscillator tunable resonant circuit 72. The shaping is in the form of an exponential taper between the grounded and diode ends of each section. Because of the exponential tapers, the impedance versus frequency characteristic of each of the composite transmission lines 67, 69 and 71 is modified. Consequently, the effects of a given capacitance change on tuning frequency varies across the frequency band resulting in similar curvatures for the plots of tuning capacity as a function of resonant frequency for the RF tunable resonant circuits 66, 68 and 70 and the oscillator tunable resonant circuit 72. The similar curvatures are shown in FIG. 8 wherein curve *a* represents the plot of tuning capacity as a function of resonant frequency for the oscillator tunable resonant circuit 72 and curves *b*, *c*, and *d* represent the plot of tuning capacity as a function of resonant frequency for the RF tunable resonant circuit 66 for different inductance settings of the adjustable tracking inductor 77, minimum, nominal and maximum. The adjustable tracking inductors will be discussed in greater detail hereinafter. Since the curvatures of the plots for the two tunable resonant circuits are similar, tracking of the resonant circuits is provided across the entire desired frequency band of each circuit.

The resonant frequency of each of the transmission lines is determined by its total reactance which includes the reactive impedances of the upper and lower aligned sections, the variable capacitance diode and the adjustable tracking inductor. The reactive contribution of the upper section varies in a nonlinear manner with frequency, while the reactive contribution of the variable capacitance diode and adjustable tracing inductor provides capacitive reactance whose magnitude is determined by the tuning voltage (identical variable capacitive diodes having the same tuning voltage impressed across them may be used in all the tunable resonant circuits). By adjustment of the tuning voltage the capacitive reactance is varied and tunes the transmission line across the band of frequencies. For proper tracking between the oscillator and RF tunable resonant circuits, the oscillator tunable resonant circuit must resonate above the RF tunable resonant circuits by a given constant amount for any given tuning voltage adjustment. The dissimilarly shaped lower sections of the RF signal selection and oscillator tunable resonant circuits cause the rate of change of the total reactance with frequency to be modified. Specifically, the lower section of each RF transmission line includes an exponential taper and the lower section of the oscillation transmission line includes a substantially linear taper. Consequently, these sections differ in rate of reactance change with frequency from each other and from their respective upper sections. This causes the total reactance of each transmission line to vary with frequency in a manner which provides tracking between the RF and oscillator tunable resonant circuits. It should be noted that the several tapered edges on the upper section of each of the transmission lines compensate for the effects of fringing of the electromagnetic and electrostatic fields at the section ends.

While shaping of the composite transmission line sections 67*b*, 69*b* and 71*b* provides a first order relative tracking of each of the several RF tunable resonant circuits with the oscillator tunable resonant circuit, nevertheless, the tunable resonant circuits must still be aligned with respect to each other to compensate for part tolerances. That is, the plots representing the capacitive characteristic of each resonant circuit must be properly centered, frequency-wise, with respect to the other tunable resonant circuits.

It has been determined that the series inductance of the lead wires of each of the variable capacitance diodes 75, 79, 83 and 87 is a significant parameter in determining the resonant frequency for a given diode capacitance, particularly at the lower end of the UHF frequency band. For example, an increase in variable capacitance diode 75 lead lengths of less than 0.1 inch results in a several picofarad reduction in capacitance required by the tunable resonant circuit 66 for it to resonate at 470 MHz. This series inductive effect provides a potential source of detuning between the several tunable resonant circuits 66, 68, 70 and 72 as well as variation from one tuner to the next. The inductive effect, however, may be controlled and utilized to provide a means for centering or aligning the tunable resonant circuits.

Figure 9:
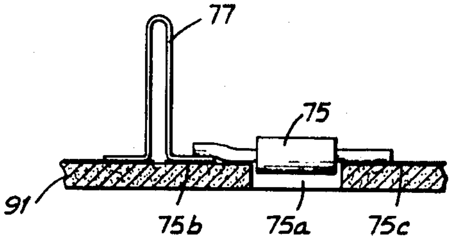
FIG. 9 is an enlarged partial section view of the substrate showing details of the tuner.

An aperture is provided in the substrate 91 for each of the variable capacitance diodes 75, 79, 83 and 87. Referring to FIG. 9 which is an enlarged partial section view of the substrate 91 showing a portion of the composite transmission line 67, variable capacitance diode 75 is positioned in an aperture 75*a* in the substrate 91. The hole 75*a* provides a location means for the body of the variable capacitance diode 75 and permits accurate positioning of the components.

The diode 75 is secured to two bondings pads 75*b* and 75*c* on opposite sides of the aperture 75*a*. The bonding pad 75*c* is an area on the second section of transmission line while the bonding pad 75*b* is a separate conductive pad. The bondings pads 75*b* and 75*c* are spaced a predetermined distance apart and help minimize the series inductance variations by providing a control for the lead lengths of the variable capacitance diode 75. Moreover, the aperture 75*a* in the substrate material 91 reduces the dielectric adjacent the body of the diode 75 to thereby minimize the distributed shunt capacitance between the ends of the diode and also eliminates the need to bend the diode leads (increasing its inductance) during mounting of the components.

Figure 10:
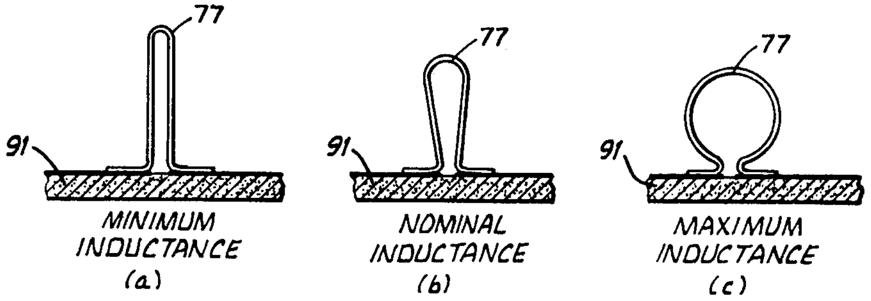

The adjustable tracking inductor 77 is connected in series between the bonding pad 75*b* and one end of the first section of the composite transmission line 67*a*. The inductor 77 consists of a thin wide strip of copper which may be adjusted to change its inductance. To change inductance, the configuration of the loop may be changed from a tall thin structure for minimum inductance to a more circular structure for maximum inductance. This is most clearly shown in FIGS. 10*a–c* where the adjustable tracking inductor 77 is shown set for minimum, nominal and maximum inductance, respectively. The series adjustable inductor for each of the composite transmission lines 67, 69, 71 and 73 swamps minor inductance variations due to the diode lead length and provides a controllable series inductive effect.

Centering of the tracking for each of the tunable resonant circuits 66, 68, 70 and 72 is obtained by adjusting the shape of the inductive loop associated with each composite transmission line. The effect of adjusting the inductor 77 is shown in FIG. 8 where the three plots of tuning capacity as a function of resonant frequency (*b*, *c*, and *d*) represent the effects of setting the adjustable tracking inductor 77 between its minimum, nominal and maximum inductance positions, respectively. The inductive loops are adjusted such that a proper constant frequency separation is obtained between the resonant frequencies of the RF tunable resonant circuits and the oscillator tunable resonant circuit across their frequency bands.

Received UHF television signals applied at the input terminal 62 are coupled through a high pass filter comprising the inductors 74 and 76 and the capacitor 78, to the RF amplifier input circuit 66. The high-pass filter functions to pass frequencies within the UHF frequency band; that is, frequencies ranging from 470 MHz. to 890 MHz. The tunable resonant circuit 66 is coupled via a capacitor 80 to the emitter electrode of a grounded base transistor amplifier 82. The transistor 82 is shown encapsulated in a conductive housing which is connected to ground by lead 102 to reduce the likelihood of parasitic oscillations.

Operating potential for the transistor 82 is obtained from a source of B+ applied to a terminal 84 which is bypassed to ground for radio frequencies by a feed through capacitor 103. The potential is applied to the collector electrode of the transistor 82 through a radio frequency decoupling inductor 86, a resistor 88, and an RF choke 90. The choke 90 is a single component including a 10 kΩ resistor providing the wire winding form for an inductor, both of which are electrically connected in parallel. The resistor reduces the figure of merit or Q of the choke to reduce the possibility of spurious parasitic resonances. The emitter electrode of the transistor 82 is connected to ground by a resistor 92 to complete the collector-emitter DC current path.

Bias to the base electrode of the transistor 82 is provided from the source of operating potential applied at the terminal 84 through the collector-emitter current path of an automatic gain control transistor 94. An automatic gain controlling potential is applied to the base electrode of the transistor 94 via a terminal 96. Terminal 96 is bypassed to ground for radio frequency signals by a feedthrough capacitor 105. The automatic gain control transistor 94 controls the base bias to the RF amplifier transistor 82, and thus, the RF amplifier stage gain. Transistor 94 is connected as an emitter-follower so that substantial isolation is provided between the automatic gain control circuits and the RF amplifier 82. Further RF isolation for the B+ supply and the AGC circuitry is provided by two feedthrough capacitors 98 and 100, respectively. The feedthrough capacitor 100 additionally provides a low-impedance RF path to ground for the base electrode of transistor 82 establishing the grounded base mode of operation.

A capacitor 104 couples the collector electrode of the RF amplifier transistor 82 and the tunable resonant circuit 68. Signals developed in the tunable resonant circuit 68 are inductively coupled to the tunable resonant circuit 70 by the inductors 106 and 108. The inductor 106 provides the dominant coupling toward the lower end of the UHF frequency band, while the inductor 108 provides the dominant coupling toward the higher end of the UHF frequency band. The tunable resonant circuits 68 and 70 with the coupling inductors 106 and 108 combine to form a double tuned interstage network interconnecting the RF amplifier stage 54 and the mixer stage 58.

The mixer stage 58 includes a mixer diode 110 having its cathode connected to a tap point 112 in the tunable resonant circuit 70. The anode of the mixer diode 110 is connected by a pickup loop 114, an inductor 116 and a capacitor 118 to the input of the IF amplifier stage 60, terminal 119–119′. Inductor 116 and capacitor 188 are apportioned to transform the diode output impedance to match the IF amplifier stage input impedance. A DC bias is applied to the mixer diode 110 from the B+ supply to maintain a DC current flow of approximately 1.5 milliamperes through the mixer diode. The bias to the diode is applied from the terminal 84 through the inductor 86 and to series connected resistors 120–122, and the pickup loop 114 to the anode of the mixer diode 110. The cathode of the diode is returned to ground through a portion of the tunable resonant circuit 70.

Amplified UHF signals are applied to the mixer diode 110 from the tunable resonant circuit 70 at the tap connection 112. An oscillator wave is applied to the mixer diode from the oscillator stage 56 so that the mixer diode heterodynes the amplified UHF signals and the locally generated signal to provide a desired IF output signal. The oscillator signal is coupled from the tunable resonant circuit 72 to the pickup loop 114 connected to the anode of the mixer diode 110. A feedthrough capacitor 124 coupled between the inductive pickup loop 114 and the point of reference potential is selected to provide a low-impedance path to ground for both the amplified UHF signals and the oscillator signal and a higher impedance path for IF signals. As a result, intermediate frequency signals generated in the mixer diode 110 are passed and applied to the IF amplifier stage 60 for amplification.

The oscillator stage 56 includes a transistor 126 connected as a modified colpitts oscillator whose frequency is determined by the tunable resonant circuit 72. Operating potential for the oscillator transistor 126 is provided by the B+ supply via the terminal 84, the inductor 86 and the resistor 120 to a junction 128 which is bypassed to ground for UHF waves by a feedthrough capacitor 130. The potential at the junction 128 is applied to the collector electrode of the oscillator transistor 126 through a resistor 132 and an RF choke 134. A DC emitter ground return for the transistor is provided by a resistor 136. Base dias is obtained through the voltage divider resistors 138 and 140, connected between the junction 128 and ground. A capacitor 142 connects the base electrode of the transistor 126 and ground to provide a frequency dependent signal path between the base electrode and ground.

A capacitor 144 couples the collector electrode of transistor 126 to the tunable resonant circuit 72. To sustain oscillation, a portion of the voltage developed at the collector electrode of the transistor is coupled to the emitter electrode of the transistor through a capacitive voltage divider including the three capacitors 146, 148 and 150. To permit a wide range of Gm transistors to be utilized in the oscillator stage, capacitor 148 is selected to roll off the high-response response of the transistor. Consequently, the capacitor 148 is selected to be lossy; that is, have a frequency dependent resistive component causing resistive loading of the oscillator transistor at the higher frequencies. One suitable capacitor is an 0.82 pf., type GA, capacitor manufactured by the Stackpole Corporation.

Since tunable resonant circuit 72 includes a low-impedance, alumina dielectric, transmission line, a relatively large value coupling capacitor 144 (as compared to the typical UHF television tuner high-impedance air dielectric, half-wave transmission line) is required for impedance matching purposes. This necessitates large capacitors in the capacitive voltage divider to provide the proper signal feedback voltages.

The capacitors 144, 146 and 150 are conductive areas formed on the substrate 91 (FIGS. 4 and 5). The capacitor 144 consists of a conductive area 501 formed over a conductive area 503 on the opposite side of the substrate within a window 505 in the ground plane 95. Capacitor 146 consists of a conductive area 503 cooperating with a conductive area 507 disposed within the window 505 adjacent area 503, and capacitor 150 consists of a conductive area 507 cooperating with the adjacent portion of the ground plane 95 to the right of the conductive area as viewed in FIG. 5. The capacitors 144, 146 and 150 may be fabricated, as other conductive areas, by printed circuit techniques. This assures that each of the several capacitances is accurately and consistently reproduced in mass production. As a result of the capacitance uniformity from tuner to tuner, the possibility of inoperative or degraded tuners due to component variations or misalignment during assembly is substantially reduced.

The oscillator tunable resonant circuit 72 exhibits an undesired resonance at about 1,400 MHz. The parasitic resonant frequency is not substantially affected by the capacitance of the variable capacitance diode 87. With the component values shown, it has been found that the undesired resonant frequency changes by approximately 60 MHz. with a capacitive variation of approximately 13 pf.

It will be noted that the parasitic resonant frequency of the oscillator's composite transmission line is a second harmonic frequency centered on approximately 700 MHz. which is within the desired UHF oscillator frequency band. A reduction of fundamental frequency oscillator signal voltage is observed as the oscillator tunable resonant circuit 72 is adjusted to resonate within this vicinity. This reduces the available oscillator signal which may be coupled to the tuner mixer diode 110. It is believed that the reduction of the fundamental frequency oscillator signal voltage is due to a suck-out effect caused by the parasitic circuit.

To prevent parasitic resonance and minimize the voltage reduction, the first section 73*a* of the oscillator's composite transmission line is coupled to the oscillator transistor 126 at the parasitic frequency voltage null point. This results in minimum spurious signal energy transfer from the tunable resonant circuit 72 through the coupling capacitor 144 to the oscillator transistor 126.

As the ground plane section 95 associated with the oscillator composite transmission line is not infinite in size and conductivity, current flows in the ground plane establishing voltages. A potential coupling path is provided for coupling these voltages from the ground plane section 95 through capacitor 142 to the base electrode of the oscillator transistor. Where the current flow in the ground plane is due to the parasitic resonance, the coupling path tends to encourage the parasitic mode of resonance. This occurs because the spurious signal which is applied to the transistor base electrode established a base-collector electrode differential voltage which is introduced into the oscillator feedback network. To minimize this effect, the capacitor 142 is positioned on the ground plane section 95 directly over the parasitic null point on the first section of the oscillator composite transmission line.

The capacitor 142 consists of a "bare disc" 509 (FIG. 5). The disc 509 is of dielectric material having conductive areas disposed on opposite faces. The base electrode of transistor 126 is electrically connected to one of the conductive faces while the opposite conductive face is positioned on the ground plane section over the null point. By positioning the capacitor 142 in this manner, a minimum voltage gradient of spurious signal is applied across the transistor collector-base junction via the two capacitors 142 and 144 which connect these electrodes to the resonant circuit. As a consequence, the spurious voltage which is introduced in the feedback path is minimized.

As is most clearly shown in FIGS. 4 and 5, no shield walls are provided between the tunable resonant circuits of the UHF tuner 50. That is, the RF tunable resonant circuit 66, the interstage tunable resonant circuits 68 and 70, and the oscillator tunable resonant circuit 72 are not compartmentalized in conductive enclosures to prevent interaction between the several resonant circuits, and more importantly, to prevent a radiation of oscillator energy through the RF tunable resonant circuit 66 and out the UHF antenna. However, the tuner 50 is provided with a partial inner oscillator conductive cover 550 (FIG. 2) which overlies the oscillator transmission line sections 73*a*–73*b*. The inner partial cover 550, because it is permanently secured as part of the tuner chassis frame 97, minimizes possible detuning effects of distance variations between the oscillator stage 56 and detachable tuner covers 99 and 101 after removal and reattachment.

The high permeability of the alumina substrate in conjunction with the close spacing between the composite transmission lines and their associated ground plane sections confines the electromagnetic fields. Nevertheless, a fringing of the electromagnetic fields, although substantially diminished, still occurs. The fringing effect of the fields can cause the oscillator energy to be coupled to the RF tunable resonant circuit 66 to be radiated via the UHF antenna. Moreover, the coupling can adversely affect the automatic gain control characteristics of the tuner.

The undesired effects of oscillator radiation are eliminated by disposing the composite transmission line of the RF tunable resonant circuit 66 on the opposite side of the alumina substrate 91 from the double tuned interstage and oscillator composite transmission lines 69, 71 and 73. The ground plane section 93 and 94 are, likewise, disposed on opposite sides of the alumina substrate. In this manner, the effectiveness of the electromagnetic and electrostatic coupling between the tunable resonant circuit 66 and the remaining tunable resonant circuits of the tuner 50 is minimized.

Further significant isolation between the RF tunable resonant circuit 66 and the remaining tunable resonant circuits of the tuner 50 is achieved by inverting the RF composite transmission line with respect to the interstage and oscillator composite transmission lines. Thus, the second shaped section 67*b* of the RF composite transmission line is disposed toward the top of the substrate while the first section 67*a* of the RF composite transmission line is disposed toward the bottom of the substrate. In contrast, the oscillator and interstage composite transmission lines each have their second section disposed toward the bottom of the alumina substrate with their first section disposed toward the top.

For impedance matching purposes, the emitter electrode of the RF transistor 82 is coupled to the low-impedance shaped section 67*b* of the RF input composite transmission line 67 and the collector electrode of transistor 82 is coupled to the high-impedance section 69*a* of the interstage composite transmission line 69. By having the composite transmission lines 67 and 69 disposed in inverted relationship, as previously described, it is possible to utilize very short lengths for the RF transistor 82 emitter and collector electrode coupling leads.

The IF amplifier stage 60 includes a transistor 152 mounted external to the conductive housing 52 and connected as a grounded base amplifier. External mounting of the transistor tends to prevent an undesired interaction between the IF amplifier stage and the RF amplifier and mixer stages. The IF input signals are applied to the transistor emitter electrode, and the collector electrode is connected to the IF output terminal 64 by a double tuned IF band-pass filter. A feedthrough capacitor 154 provides a radio frequency bypass to ground for the transistor's base electrode. To minimize the effects of high-frequency parasitic oscillatory circuit paths, a ferrite bead 155 is applied to the collector electrode of the transistor 82.

The first section of the double tuned IF band-pass filter includes a feedthrough capacitor 156, an inductor 158 and a feedthrough capacitor 160. The second section of the double tuned band-pass filter includes the feedthrough capacitor 160, an inductor 162 and the capacitors 164 and 166; capacitor 160, common to both filters, provides the requisite signal coupling between the sections of the filter. A standoff terminal 163 provides a small capacitance mechanical support for the junction of the inductor 162 and capacitor 164. Resistive loading of the filters (resistors 172, 174 and an IF signal cable, not shown, coupled to terminal 64) is selected so that the signal response of the IF amplifier stage 60 is flat across the entire desired IF band. That is, equal amplification of signal voltages if provided between both ends of the intermediate frequency band (approximately 41 MHz. to 46 MHz.). The shaped IF response commonly associated with television intermediate frequency amplifiers is achieved in later IF stages associated with the television receiver chassis and the VHF tuner. In the latter case, the VHF tuner may be used to provide additional amplification of the UHF tuner IF output signal.

The IF band-pass filter transforms the output impedance of the grounded base IF amplifier transistor 152 to a resistive output of 75 ohms at the center frequency of the IF band, 43 MHz. This is achieved by adjusting the tuning slugs in inductors 158 and 162 while applying an IF input signal at test point terminal 169. Although the impedance transformation provided by the band-pass filter is frequency dependent, the deviation from 43 MHz. to the upper and lower ends of the IF band is not sufficient to materially change the nature of the output impedance at the terminal 64. Specifically, the impedance at both the high end and the low end of the IF frequency band remains predominantly a resistive impedance of 75 ohms.

When the tuner IF output terminal 64 is coupled to succeeding IF amplifying stage associated with the television receiver chassis by a 75 ohm coupling cable, the impedance looking into the terminal 64 closely matches the characteristic impedance of the cable and no reflections occur back along the cable. As a result, any length of coupling cable can be used to couple signals between the television tuner and chassis. Naturally, termination of the cable on the television chassis must, likewise, be a 75 ohm resistive load. Moreover, because resistive coupling is provided between the tuner 50 and the television chassis, any capacitive variations which occur due to coupling cable dress do not detune the coupling link as there is no inductance with which the capacitance can resonate. Consequently, the dress of the IF coupling cable is not critical to proper performance of the tuner. It should be recognized that since an amplified IF output signal is provided by the tuner 50, any minor losses in the resistive coupling are not significant.

Operating potential for the IF amplifier transistor 152 is obtained from the B+ supply at the terminal 84, through the inductor 86, an RF isolation inductor 168 and the inductor 158 to the collector electrode of the transistor 152. A resistor 170 is connected between the emitter electrode of the transistor and ground to complete the DC current path. Base bias for the transistor 152 is provided by a voltage divider including the resistors 172 and 174 connected between the inductor 158 and ground.

A source of variable DC tuning voltage 175 for biasing the variable capacitance diodes associated with the four tunable resonant circuits has an internal resistance of 1,000 ohms and is connected between terminal 176 and ground. The terminal 176 is bypassed for radio frequency signals by a feedthrough capacitor 177. The tuning voltage is applied via the resistors 178 and 180 to a junction 190 which provides a common point of tuning potential for the four tunable resonant circuits. The junction 190 is coupled to the tunable resonant circuit 66 via the resistors 180 and 179 and to the tunable resonant circuit 70 via the resistor 182. The junction 190 voltage applied to the tunable resonant circuit 70 is applied to the tunable resonant circuit 68 via the inductor 106. The junction 190 is also coupled to the tunable resonant circuit 72 by resistor 185, a resistor 187 and the RF choke 188. Three feedthrough capacitors 184, 186 and 183 cooperate with the resistors 180 and 185 to prevent RF and oscillator signal energy from being coupled via the DC tuning line between the several tunable resonant circuits and into the source of tuning voltage 175.

With the component values shown, a variable capacitance diode having a capacitance range of approximately 13 picofarads will permit the RF tunable resonant circuits 66, 68, and 70 and the oscillator tunable resonant circuit to be tuned across their respective frequency bands. One suitable variable capacitance diode is the BA 141 diode manufactured by the International Telephone & Telegraph Corporation. The BA 141 diode provides a capacitance ranging from 15 picofarads to 2.3 picofarads as the tuning voltage is adjusted between approximately 1 and 25 volts DC.

Figure 12:
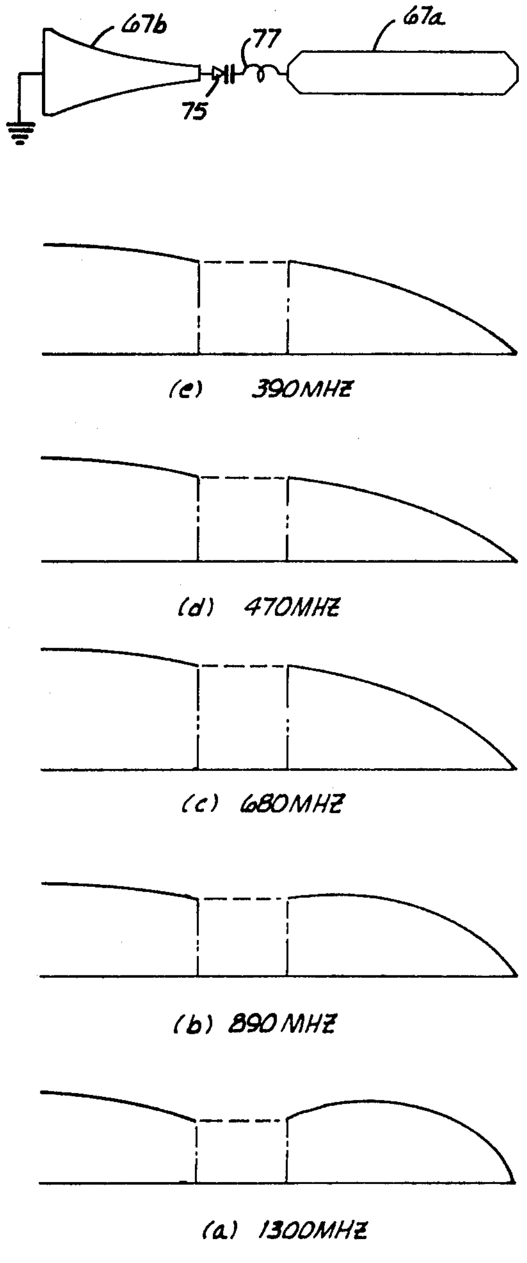

The tuning of the tunable resonant circuits (transmission lines) may be understood by reference to FIGS. 11 and 12 showing the standing waves of voltage and current, respectively, along the RF input composite transmission line 67 which is shown at the top of the Figures. To tune the transmission line 67 to the highest frequency within the RF UHF band (FIG. 11*b*), a voltage is applied across the variable capacitance diode 75 such that it exhibits a predetermined capacitance. This capacitance causes the composite transmission line to resonate with a voltage null on the transmission line section 67*a* located at a point between the center and the diode end of the section.

An increase in the voltage across the diode 75 reduces the diode capacitance and causes the composite transmission line 67 to resonate at a higher frequency. The voltage null on the transmission line section 67*a* displaces toward the center of the section (FIG. 11*a*). A reduction in the voltage across the diode 75 increases the capacitance and causes the composite transmission line 67 to resonate at a lower frequency. The voltage null on the transmission line section 67*a* displaces toward the diode end of the section. The amount of frequency change for a given capacitance increase is dependent upon the characteristic impedance of the transmission line which is a function of the width of the line, the spacing from the ground plane and the dielectric of the intervening medium.

As the voltage across the diode 75 is further reduced, lowering the resonant frequency of the composite transmission line, a point is reached, approximately near in the middle of the desired frequency band (FIG. 11*c*), where the diode capacitance series resonates with the inductance of the adjustable tracking inductor 77 and the transmission line section 67*b*). At this time, the voltage null on the transmission line section 67*a* is completely displaced to the diode end of the section.

A still further reduction of the voltage across the diode 75 continues to lower the resonant frequency of the composite transmission line 67 (FIGS. 11*b* and *e*). The voltage at the diode end of the transmission line section 67*a* increases and the composite transmission line 67 resonates in a modified ¼ wavelength mode.

The positioning of the variable capacitance diode 75 away from the grounded end of the composite transmission line 67 helps maintain a high figure of merit. This is because the variable capacitance diode 75 is located at a lower current point as compared to the grounded end of the composite transmission line (FIG. 12). As a result, $I^2R$ diode losses are minimized.

At the low end of the frequency band the oscillator diode 87 has a reverse bias of approximately 1.0 volt. The oscillator voltage developed across the diode is of sufficient amplitude during a portion of each cycle to exceed the diode reverse bias causing rectification of the oscillator voltage. The rectified voltage increases the reverse bias decreasing the diode 87 capacitance. This in turn causes the tunable resonant circuit 72 to become tuned to a different frequency. No rectification occurs in the RF tunable resonant circuits 66, 68 and 70 because the RF UHF signal in these circuits is in the order of millivolts as opposed to the order of approximately 1.0 volt in the tunable resonant circuit of the oscillator. To minimize the detuning effect, the total resistance to ground from the diode 87 through the DC tuning line and the source of tuning voltage 175 is selected to be small compared to the oscillator stage driving resistance. In this manner, the tuning voltage at the terminal 176 predominates in controlling the voltage across the diode because the diode current flowing through the total resistance sets up a relatively small voltage which is insufficient to appreciably change the average DC voltage across the diode.

What is claimed is:

1. An oscillator having means for suppressing spurious oscillations at a frequency above the desired frequency range comprising:

a transistor having base, emitter and collector electrodes;

a transmission line comprising an elongated conductive section disposed on a dielectric supporting plate and overlying a conductive ground plane area on the opposite side of said plate, said transmission line being susceptible to spurious resonance above the desired frequency of operation which resonance is characterized by a voltage null at a particular location on said transmission line;

first means coupling the collector electrode of said transistor to said location on said transmission line; and feedback means interconnecting said base, collector, and emitter electrodes to sustain oscillation at a frequency determined by said transistor line, said feedback lines including an impedance element connected from one of said base and emitter electrodes to said ground plane at a point opposite the location of said voltage null on said transmission line.

2. An oscillator as defined in claim 1 wherein said first coupling means and said impedance element are capacitors.

3. An oscillator as defined in claim 2 wherein said supporting plate is a dielectric plate having a high permeability.

4. An oscillator as defined in claim 3 wherein said capacitor comprising said first coupling means is formed of conductive areas on said supporting plate.

5. An oscillator as defined in claim 4 wherein said supporting plate is formed from an aluminum oxide compound.

6. A UHF oscillator having means for suppressing spurious oscillation at a frequency above the desired frequency range comprising:

an active device having a first and a second electrode;

a transmission line comprising first and second aligned conductive sections disposed on a dielectric plate and overlying a conductive ground plane area on the opposite side of said plate, one end of said first section electrically connected to said ground plane;

said transmission line being susceptible to spurious resonance above the desired frequency of operation which resonance is characterized by a voltage null at a particular location on said second section;

first means coupling the first electrode of said device to said location on said transmission line; and feedback means coupled to said device to sustain oscillation at a frequency determined by said transmission line, said feedback means including an impedance element connected from the second electrode of said device to said ground plane at a point opposite the location of said voltage null on said second section.

7. A UHF oscillator as defined in claim 6 wherein said ground plane area includes a window exposing said dielectric plate and a conductive area disposed within said window which cooperates with another conductive area on said dielectric plate to provide a circuit capacitance for said oscillator.

8. An oscillator of the type including an active device having a feedback network coupled to said device electrodes, comprising:

a transmission line comprising an elongated conductive section disposed on a dielectric supporting plate and overlying a conductive ground plane area on the opposite side of said plate;

said ground plane conductive area including a window exposing said dielectric supporting plate; and a first conductive area disposed within said ground plane window forming a part of said feedback network.

9. An oscillator as defined in claim 8 including a second conductive area disposed within said ground plane window.

10. An oscillator as defined in claim 9 wherein said active device is a three terminal device having a first, a second and a control electrode, and said first and said second conductive areas provide a capacitance interconnecting said first and said second device electrode.

11. An oscillator as defined in claim 10 including a third conductive area disposed on said dielectric plate such that said first and said second conductive areas overlie said third conductive area on the opposite side of said plate, said opposite disposed conductive areas cooperating to provide a capacitance coupling said device first electrode and said conductive section.

12. An oscillator as defined in claim 11 wherein one of said first and said second conductive areas cooperates with the adjacent area of said ground plane to provide a capacitance connecting said device second electrode and said ground plane.

13. An oscillator as defined in claim 12 including a variable capacitance device coupled to said transmission line such that said oscillator is tunable across a band of frequencies ranging from 517 MHz. to 931 MHz.

* * * * *

UNITED STATES PATENT OFFICE
CERTIFICATE OF CORRECTION

Patent No. 3,624,554 Dated November 30, 1971

Inventor(s) Stephen Earl Hilliker & John Barrett George

It is certified that error appears in the above-identified patent and that said Letters Patent are hereby corrected as shown below:

In Column 1, lines 46-47, delete "transmission frequency b),". Column 3, line 65, delete "tracing" and substitute therefor -- tracking --. Column 5, line 73, delete "188" and substitute therefor -- 118 --. Column 6, line 34, delete "dias" and substitute therefor -- bias --; line 46, delete "high-response" and substitute therefor -- high frequency --. Column 8, lines 8-9, "section" should be -- sections --. Column 10, line 24, after "67b" delete ")". Column 11, line 3, delete "transistor" and substitute therefor -- transmission --; "feedback lines" should read -- feedback means --.

Signed and sealed this 30th day of May 1972.

(SEAL)
Attest:

EDWARD M.FLETCHER, JR.
Attesting Officer

ROBERT GOTTSCHALK
Commissioner of Patents

RM PO-1050 (10-69)

USCOMM-DC 60376-P69
* U.S. GOVERNMENT PRINTING OFFICE : 1969 O—366-334